(12) United States Patent
Tran

(10) Patent No.: US 9,063,747 B2
(45) Date of Patent: Jun. 23, 2015

(54) MICROPROCESSOR SYSTEMS AND METHODS FOR A COMBINED REGISTER FILE AND CHECKPOINT REPAIR REGISTER

(75) Inventor: Thang M. Tran, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 1087 days.

(21) Appl. No.: 13/096,282

(22) Filed: Apr. 28, 2011

(65) Prior Publication Data

US 2012/0278592 A1   Nov. 1, 2012

(51) Int. Cl.
*G06F 9/30* (2006.01)
*G06F 9/38* (2006.01)

(52) U.S. Cl.
CPC .......... *G06F 9/3863* (2013.01); *G06F 9/30116* (2013.01); *G06F 9/3851* (2013.01)

(58) Field of Classification Search
CPC .. G06F 9/30116; G06F 9/3851; G06F 9/3863
See application file for complete search history.

(56) References Cited

U.S. PATENT DOCUMENTS

| 5,659,721 A | 8/1997 | Shen et al. |
| 6,941,489 B2 * | 9/2005 | DeLano ......................... 714/10 |
| 7,206,903 B1 * | 4/2007 | Moir et al. .................... 711/145 |
| 7,475,230 B2 | 1/2009 | Chou et al. |
| 2010/0262812 A1 * | 10/2010 | Lopez et al. .................. 712/228 |

* cited by examiner

*Primary Examiner* — David J Huisman

(57) ABSTRACT

In a processor, a decode unit identifies instructions needing a checkpoint and enables selected checkpoints. A register file unit includes a plurality of architectural registers. A first set of checkpoint registers correspond to a first checkpoint. Each checkpoint register corresponds to a corresponding architectural register. A first set of indicators correspond to the first set of checkpoint registers to indicate whether the corresponding architectural register has been modified or is intended to be modified prior to enabling of the first checkpoint. A second set of indicators correspond to the first set of checkpoint registers and indicate whether the corresponding architectural register has been modified or is intended to be modified after enabling the first checkpoint.

19 Claims, 8 Drawing Sheets

| CHECKPOINT | | |
|---|---|---|
| TAG | | |
| N0 | I0 | R1 |
| N0 | I2 | R30 |
| | I3 | CHECKPOINT 0 (BRANCH/LOAD) → REDIRECTION |
| TAG0 | I4 | R31 |
| TAG0 | I5 | R30 |
| TAG0 | I6 | R2 |
| | I7 | CHECKPOINT 1 |
| TAG1 | I8 | R0 |

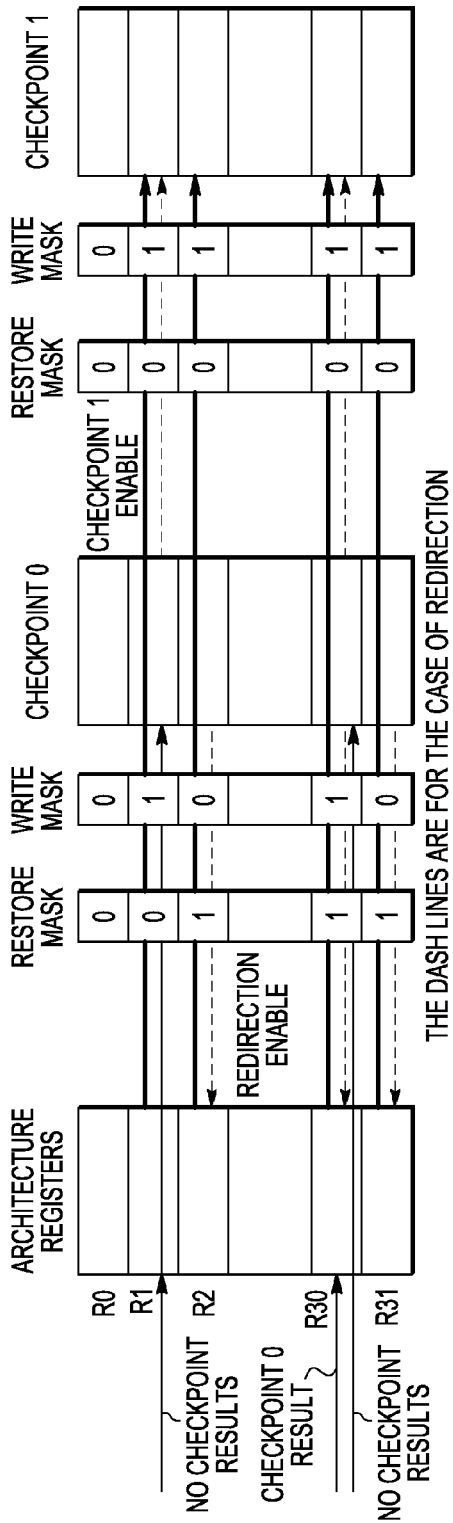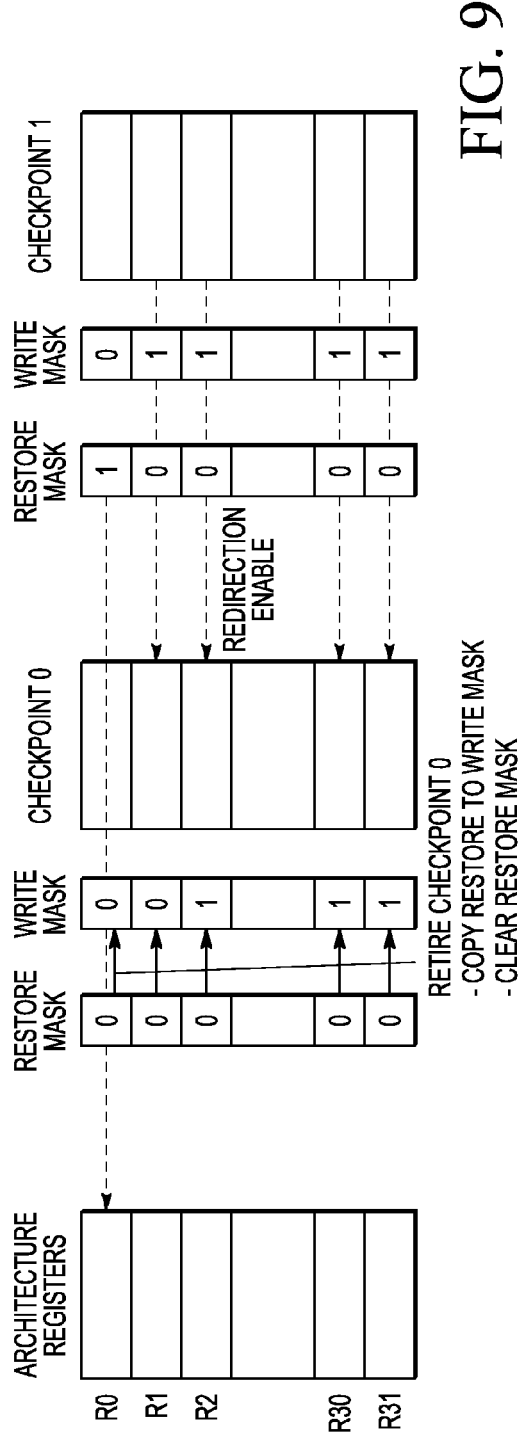
FIG. 8
FIG. 9

MICROPROCESSOR SYSTEMS AND METHODS FOR A COMBINED REGISTER FILE AND CHECKPOINT REPAIR REGISTER

BACKGROUND

1. Field

This disclosure relates generally to computer processor architecture, and more specifically, to configuring a computer processor.

2. Related Art

One goal of ongoing processor development is to increase the number of instructions per cycle (IPC). A computer processor's IPC is typically limited by stalling of instructions in queues due to the inability to access memory when instructions are executed in-order. Issuing instructions out-of-order can help to a certain degree, but eventually stalled instructions will block other independent instructions from execution as out-of-order dependent instructions fill up the queue.

Further, there is ever-increasing pressure to reduce power consumption in computer processor devices to conserve available power and extend the operating life of portable devices between re-charging cycles. Checkpoint repair is an efficient way to save and restore a machine's state after load instruction exception or branch instruction misprediction occurs. In conventional systems, the entire register file is copied on each checkpoint. The larger the number of registers, the more power is required to perform each checkpoint.

BRIEF DESCRIPTION OF THE DRAWINGS

Embodiments of the present disclosure are illustrated by way of example and are not limited by the accompanying figures, in which like references indicate similar elements. Elements in the figures are illustrated for simplicity and clarity and have not necessarily been drawn to scale.

FIG. 6 is an example of series of instructions that are handled using architectural and checkpoint registers 306 of FIG. 3.

FIGS. 7-9 are diagrams of an embodiment of architecture and checkpoint registers being used at different stages of instruction handling in the computer processor of FIG. 2.

DETAILED DESCRIPTION

Figure 1:
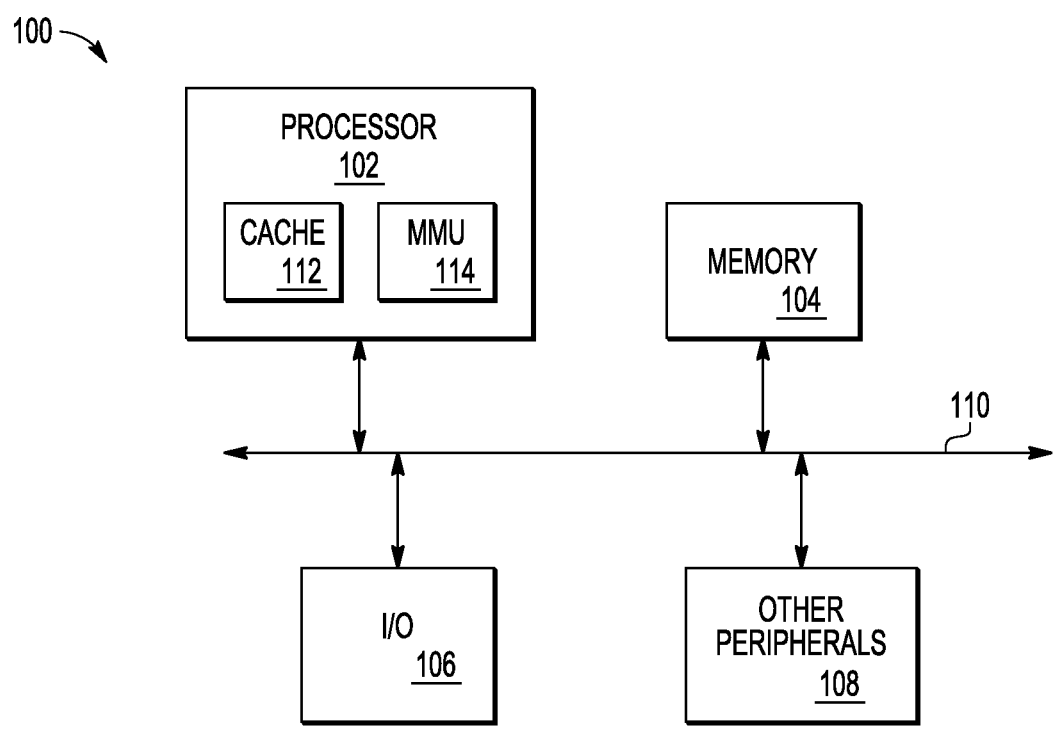
FIG. 1 is a diagram of an embodiment of a computer processing system in accordance with the present disclosure.

FIG. 1 shows a computer processing system 100 in which instruction decode and issue for latency tolerance execution can be implemented according to some embodiments of the disclosure. System 100 can be a superscalar microprocessor architecture in which instructions are issued in order to execution queues and instructions in each execution queue are executed in order but the instructions from different execution queues can execute out-of-order. At comparable performance points, system 100 has the lower power and area requirements than systems that use only out-of-order execution queues.

In the illustrated embodiment, components in computer processing system 100 include processor 102, memory 104, input/output (I/O) handlers/interfaces 106, and other peripheral devices or modules 108 which are bi-directionally coupled to bus 110 to allow communication between components. Processor 102 includes Level 1 cache memory units 112 and memory management unit (MMU) 114.

Bus 110 may communicate external to computer processing system 100. Alternate embodiments of the present disclosure may use more, less, or different components and functional blocks that those illustrated in FIG. 1. As some possible examples, alternate embodiments of computer processing system 100 may include a timer, a serial peripheral interface, a digital-to-analog converter, an analog-to digital converter, a driver (e.g. a liquid crystal display driver), and/or a plurality of types of memory.

MMU 114 is capable of providing various cache memory and bus control signals high-speed as well as virtual address to physical address translation. The virtual address is an address that is generated by processor 102 and as viewed by code that is executed by processor 102. The physical address is used to access the various higher-level memory banks such as a level-one RAM memory. Once processor 102 requests data from memory, MMU 114 can send a task identifier associated to the data request (or more generally to the task that is being executed by processor 102) to memory 104 and also to data cache internal to processor 102.

In alternate embodiments, computer processing system 100 may include one, two, or any number of processors 102. If a plurality of processors 102 are used in computer processing system 100, any number of them may be the same, or may be different. Note that although computer processing system 100 may have a plurality of processors 102, a single processor 102 which by itself can execute a plurality of instruction sets.

Memory module 104 can include a multi-level cache architecture including one or more levels of instruction cache and data cache module that have slower access rates than Level 1 cache modules 112. Memory 104 can also include an external memory that is also referred to as a main memory and can optionally include additional devices such as buffers and the like.

Figure 2:
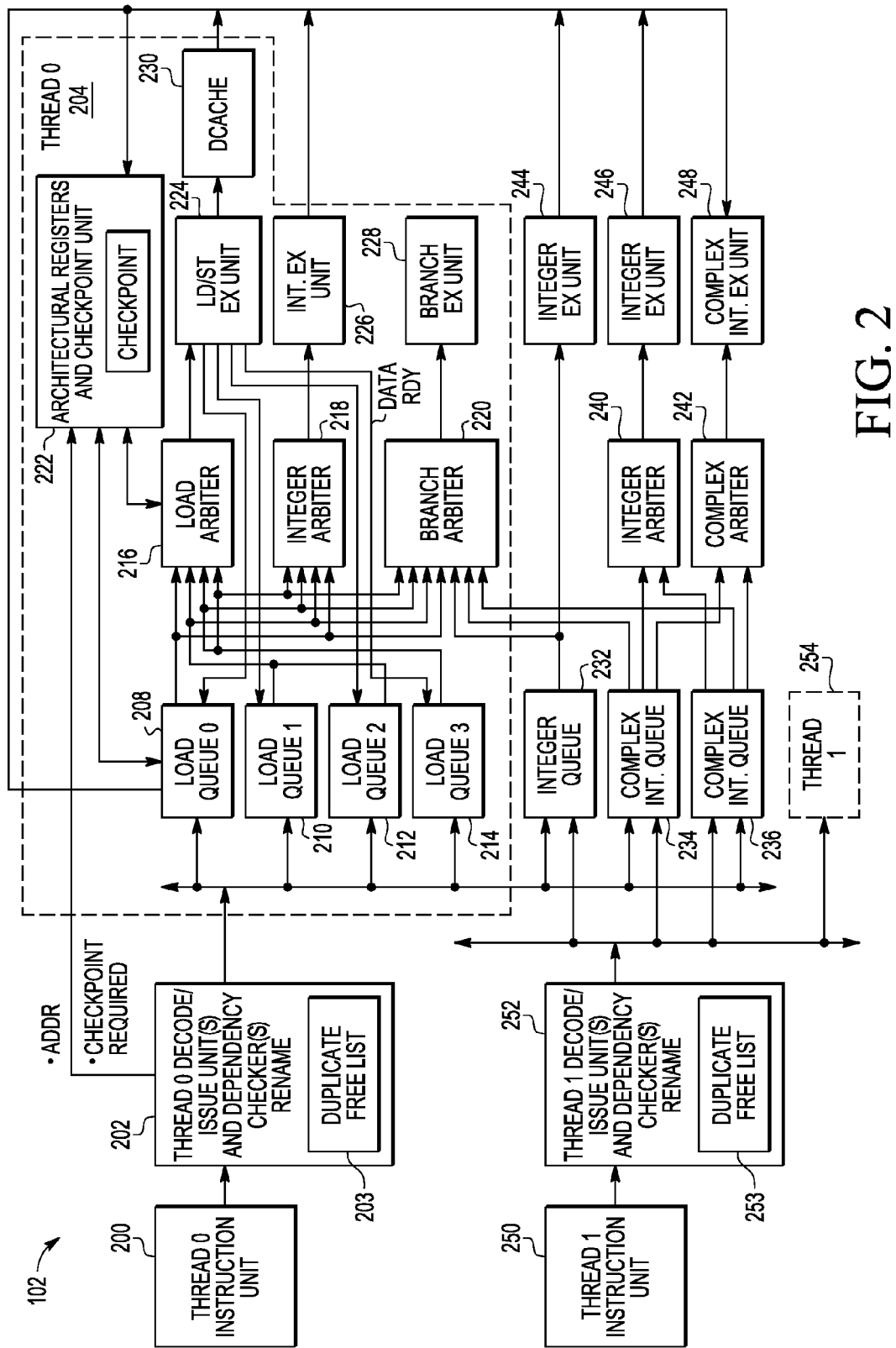
FIG. 2 is a diagram of an embodiment of instruction handling components that can be included in the computer processor of FIG. 1.

FIG. 2 is a diagram of an embodiment of instruction handling components that can be included in computer processor 102 of FIG. 1 with latency tolerance execution of one or more program threads (e.g., Thread0 and Thread1). Thread0 and Thread1 instruction units 200, 250 implement instruction queues configured to provide program instructions to respective decode units 202, 252. Decode units 202, 252 can include logic to multiplex valid instructions, decode instructions for instruction type, source, and destination operands, generate queue entries and tags for instructions, rename instruction operands to a latest register mapping, determine source and destination register dependencies between decoded instructions, check dependency with previous instructions in execution queues, and separate complex instructions into micro-instructions.

Decode units 202, 252 issue instructions to execution queues, and update register renaming for issued instructions. In the embodiment shown, a group of components 204 in processor 102 allocated to Thread0 includes load queues 208, 210, 212, 214, integer queue 232, and complex integer queues 234, 236. Another group of components 254 in processor 102 allocated to Thread1 includes a separate set of load queues 208-214, while integer queue 232 and complex integer queues 234, 236 can be shared with Thread0.

Note that although the architecture shows components for Thread0 and Thread1, additional program threads can be executed by processor 102. For example, although not labeled in FIG. 2, the components allocated for Thread0 may be used to execute Thread0 and a Thread2 while components allocated for Thread1 may be used to execute Thread1 and a Thread3. Further, processor 102 may use components for Thread0 and Thread1 to process a greater number of instructions per cycle while executing only one thread at a time. Components that can be duplicated to support multi-threading are shown within a dashed box 204 in FIG. 2 that includes load queues 208-214, load arbiter 216, integer arbiter 218, branch arbiter 220, architectural and checkpoint unit 222, load/store unit 224, integer execution unit 226, branch execution unit 228, and data cache 230.

Processor 102 can further schedule execution of instructions using load arbiter 216, one or more integer arbiters 218, 240, branch arbiter 220, and complex arbiter 242. Load arbiter 216 and integer arbiter 218 can arbitrate execution of load/store and integer instructions in load queues 208-214. Branch arbiter 220 can arbitrate execution of branch instructions in load queues 208-214 as well as integer instructions in integer queue 232 and complex integer queues 234, 236. Integer arbiter 240 and complex arbiter 242 can each arbitrate integer instructions from complex integer queues 234, 236.

In single thread mode, processor 102 can concurrently send two instructions to decode unit 202 and one instruction to decode unit 252 resulting in execution of three instructions per cycle. In multi-thread mode, two threads can concurrently send two instructions each to decode units 202, 252 resulting in execution of two instructions per cycle per thread. Decode units 202, 252 can also handle issuing serialize instructions such as instruction exceptions (e.g., Translation Look-aside Buffer miss, breakpoint, and illegal instruction), software interrupts (SWI), and instructions that modify processor configuration and states.

Load arbiter 216 sends instructions to Load/store unit 224. Integer arbiter 218 sends instructions to integer execution unit 226. Branch arbiter 220 sends instructions to branch execution unit 228. Integer queue 232 sends instructions to integer execution unit 244. Integer arbiter 240 sends instructions to integer execution unit 246, and complex arbiter 242 sends instructions to complex integer execution unit 248. Note that integer arbiters 218 and 240 can be combined into one arbiter that receives instructions from load queues 208-214 and complex integer queues 234, 236, and send instructions to integer execution unit 226.

Load instructions from load queues 208-214 dispatch to load/store unit 224 and will remain in a respective queue until data is returned in the next clock cycle, effectively blocking all dependent instructions until valid data is returned in the next clock cycle.

Figures 3, 4:
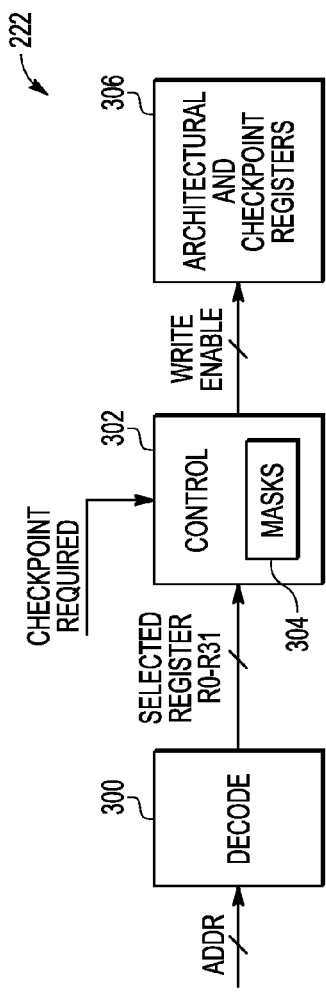
FIG. 3 is a diagram of an embodiment of components in a checkpoint and register file unit that can be included in the computer processor of FIG. 2.
FIG. 4 is a diagram of an embodiment of a load queue entry in the computer processor of FIG. 2.

FIG. 3 is a diagram of an embodiment of components in architectural and checkpoint unit 222 that can be included in the computer processor of FIG. 2 including address decode unit 300, control unit 302 with restore and write masks 304, and architectural and checkpoint registers 306. Instruction address bits are provided from decode/issue unit 202 to address decode unit 300. Address decode unit 300 determines a destination register corresponding to the address bits and sends the selected register to control unit 302. Masks 304 include write masks and restore masks that are used to manage writes to architectural and checkpoint registers 306 using a write enable signal on a selective basis. That is, use of masks 304 enables selective writes without refreshing all the registers to write or restore data associated with a checkpoint, thus requiring less power for processor 102 to perform checkpoint operations.

Control unit 302 also receives an indicator of whether a checkpoint is required for a particular instruction from decode/issue unit 202. The checkpoint required indicator is set when an exception occurs for a load instruction or a misprediction is made for a branch instruction.

Architectural registers are used by other components in processor 102 while executing instructions while checkpoint registers are used to store the state of the architectural registers when a redirection occurs due to a load instruction exception or a branch instruction misprediction.

Any suitable number of architectural and checkpoint registers 306 having any suitable number of bits per register data word can be included. For example, in some implementations, there may be 32 architectural registers and seven checkpoint registers per architectural register with the architectural registers and each checkpoint register corresponding to a particular architectural register have 32 registers of 64 bits of data. Each checkpoint register also has a corresponding write mask and restore mask, which are also referred to herein as sets of first and second indicators. The write masks indicate whether the corresponding architectural register has been modified or is intended to be modified prior to enabling a checkpoint. The restore masks indicate whether the corresponding architectural register has been modified or is intended to be modified after enabling a checkpoint.

FIG. 4 is a diagram of an embodiment of load queue entry 400 that can be used for instructions in computer processor 102 of FIG. 1 that includes several fields or tags with the following labels and corresponding significance:

| | |
|---|---|
| SRC0 | first source operand |
| SRC0_VALID | first source operand is valid |
| SRC0_DEPEND | first operand depends on immediately preceding instruction in the same queue |
| SRC1 | second source operand |
| SCR1_VALID | second source operand is valid |
| SRC1_DEPEND | second operand depends on immediately preceding instruction in the same queue |
| DST | destination operand in register file to store result of instruction execution |
| DST-VALID | destination is valid |
| ITYPE | type of instruction |
| VALID | instruction entry is valid |
| LSCNT | time stamp for instruction (can be counter value or clock value) |
| PEND | instruction has been sent to load/store execution unit and is waiting for data that is ready to be sent in the next clock cycle |
| PCTAG | location of program counter information |
| PDTAG | location of branch prediction information |
| CP_TAG | indicates checkpoint register is being used |
| CP_Valid | indicates whether checkpoint register is valid or enabled (i.e., checkpoint has been written or is intended to be written) |
| SRC_Data | source operand data |
| SRC_Select | indicates which source operand uses source data (SRC_Data) |

Other suitable fields and tags can be used in entry 400 in addition to or instead of the fields/tags shown hereinabove. Entry 400 can be used by decoder unit 202, load queues 208-214, architectural and checkpoint unit 222, and arbiters 216, 218, 220, 240, 242 to keep track of instructions. The fields/tags can be used as signals or indicators in processor 102 and methods performed therein.

Figure 5A:
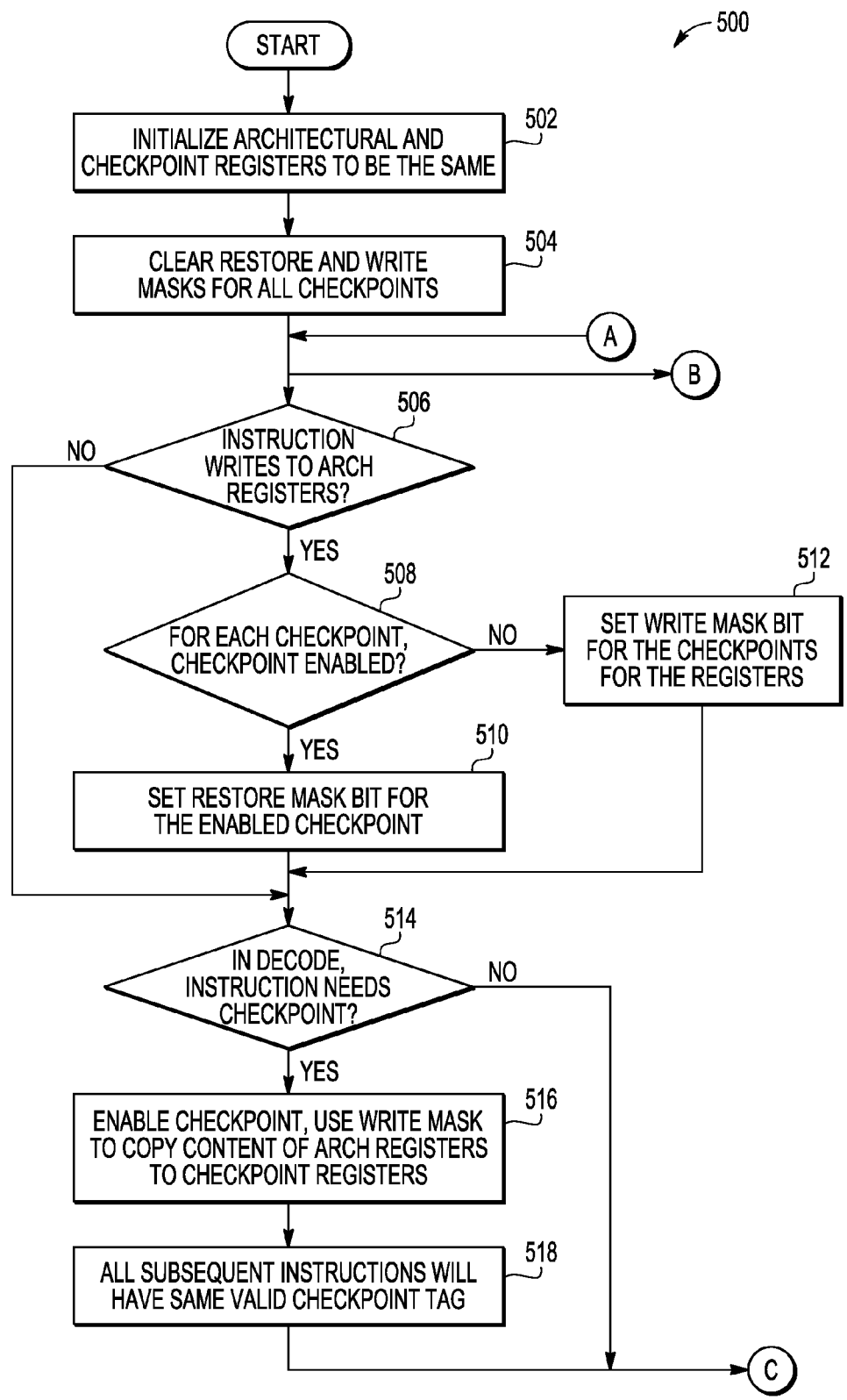
FIG. 5 is a flow diagram of an embodiment of a method for processing a first instruction of a clock cycle in the computer processor of FIG. 2.
Figure 5B:
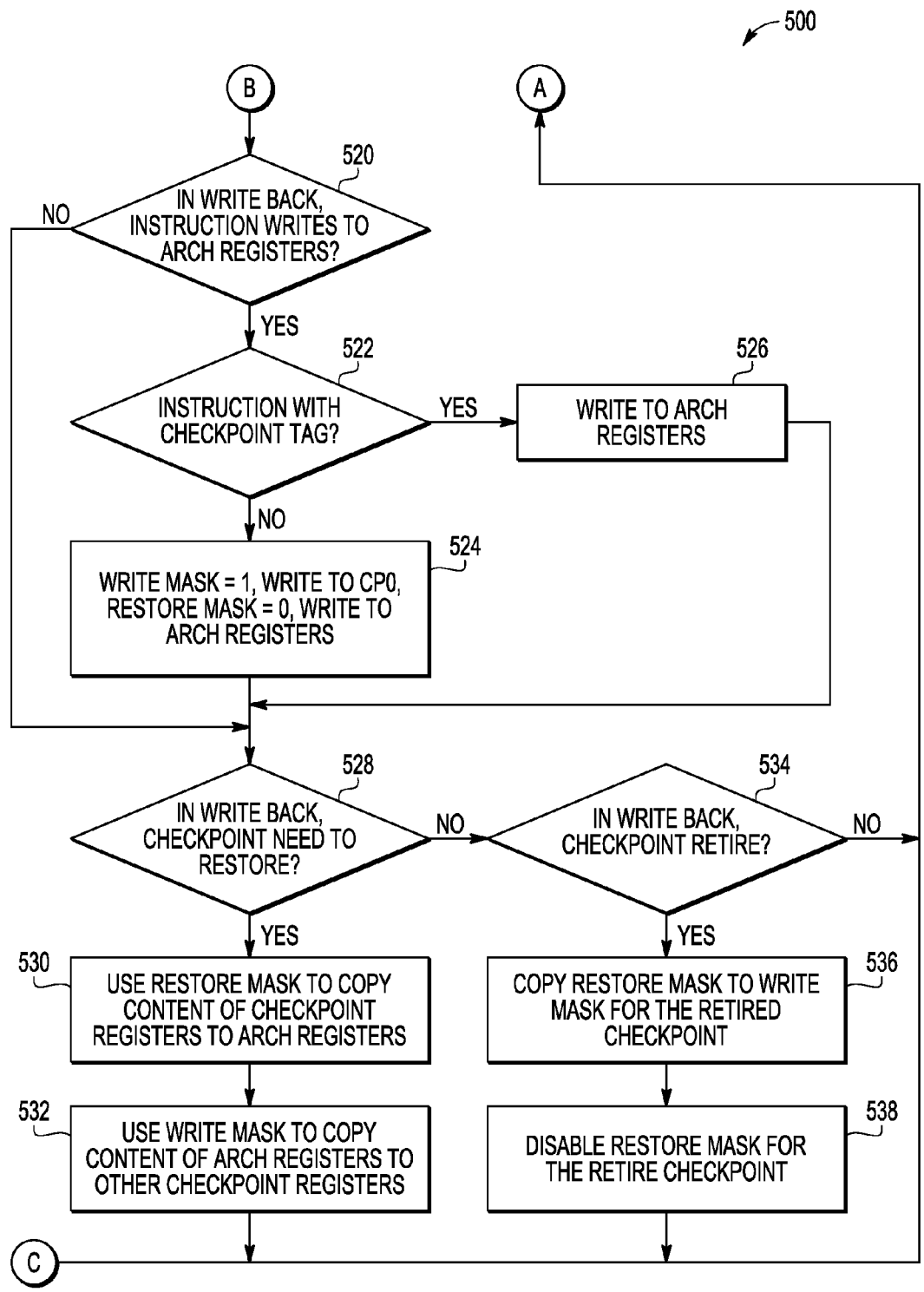

Referring to FIGS. 2, 3, and 5, FIG. 5 is a flow diagram of an embodiment of a method 500 that can be performed by control unit 302 (FIG. 3) in the computer processor 102 of FIG. 2. Process 502 can include initializing architectural and checkpoint registers 306 to have the same values. In some implementations, registers 360 are set to zero or cleared.

Process 504 includes clearing the restore and write masks 304 for all checkpoints.

Process 506 includes determining whether a particular instruction writes to an architectural register. If so, process 508 determines whether each checkpoint is enabled. If a particular checkpoint is enabled, process 510 sets the restore mask bit for the enabled checkpoint. If a particular checkpoint is not enabled, process 512 sets a write mask bit for the checkpoints for the register being used by the instruction, as determined by process 506. Method 500 then proceeds to process 514 upon completion of processes 508-512. Method 500 also proceeds to process 514 if process 506 determined that the instruction from the address decode unit does not write to the architectural registers.

Process 514 determines whether a checkpoint required indicator was sent from the decode/issue unit 202. If the checkpoint required indicator was sent, process 516 enables a checkpoint register by enabling a checkpoint valid indicator (CP_VALID) and uses a write mask to copy the contents of selected architectural registers to the enabled checkpoint register. Process 518 modifies load queue entries to provide a checkpoint tag (CP_TAG) to all subsequent instructions. Process 518 returns control to process 506.

Method 500 also includes processes 520-538, which may be invoked to restore a checkpoint in write back mode. Write back mode is entered to restore the processor to a checkpointed state when an exception occurs in the corresponding branch or load instruction.

Process 520 determines whether a checkpoint is being written back to the architectural registers. If a checkpoint is being written to the architectural registers, process 522 determines whether the instruction has a checkpoint tag (CP_TAG). If the instruction does not have a checkpoint tag, process 524 writes the result to checkpoint zero (CP-0) registers if the write mask is 1, and if the restore mask is zero (0), process 524 writes the result to the architectural registers.

Returning to process 522, if the instruction has a checkpoint tag, process 526 writes the result to the architectural registers.

Once processes 524, 526 are completed, or process 520 determines that a result is not being written to the architectural registers, process 528 determines whether a checkpoint needs to be restored in write back mode. A checkpoint will be restored if a branch instruction executes with a misprediction, or if an exception occurs during a load instruction, for example. If a checkpoint needs to be restored, process 530 uses the restore mask to copy the content of the checkpoint registers to the architectural registers. Process 532 uses the write mask to copy the contents of the architectural registers to other checkpoint registers, similar to process 502. Process 532 returns control to process 506.

If process 528 determines that a checkpoint does not need to be restored in write back mode, process 534 determines whether a checkpoint should be retired. A checkpoint will be retired if a branch instruction executes with no misprediction, or if a load instruction executes with no exception, for example. If a checkpoint does not need to be restored in write back mode, process 536 copies the restore mask to the write mask for the retired checkpoint. Process 538 disables the restore mask for the retired checkpoint. Process 538 returns control to process 506.

Note that processes 520-538 can be executed in parallel or sequentially, with processes 506-518.

Figures 6, 7:
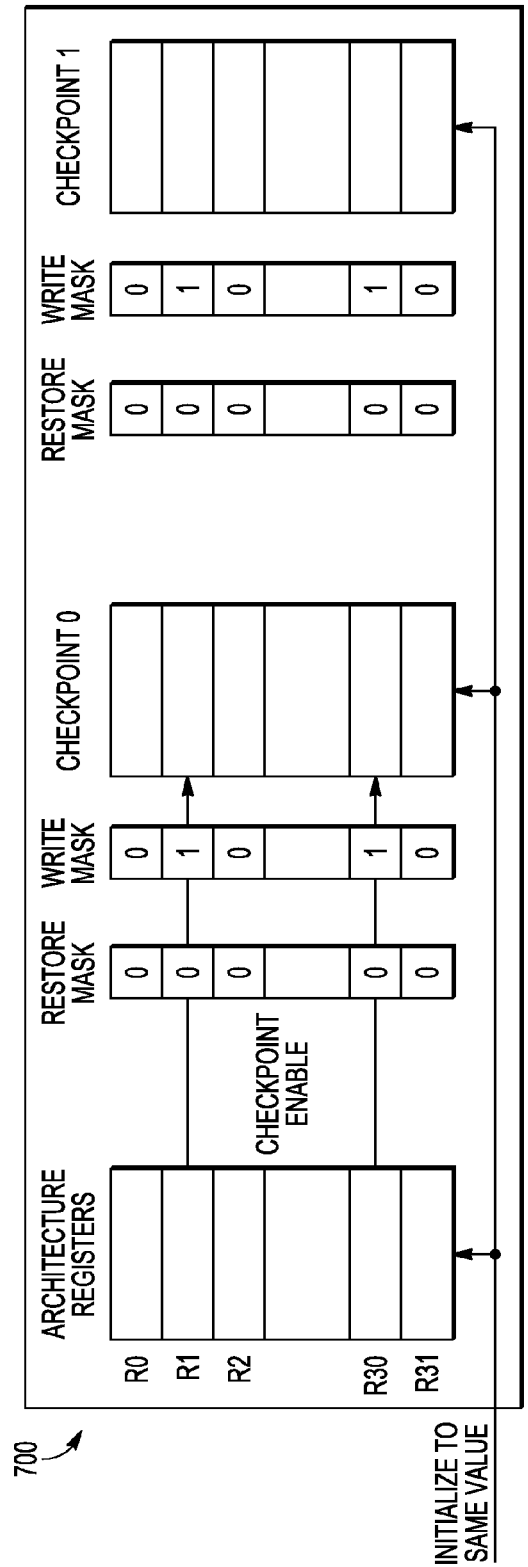

Referring to FIGS. 6-9, FIG. 6 is an example of series of instructions that are handled using architectural and checkpoint registers 306 of FIG. 3. FIGS. 7-9 show snapshots of a portion of architectural and checkpoint registers 306 as the instructions of FIG. 6 are handled. In the embodiments shown, there are 32 architectural registers and two checkpoint registers (CP-0 and CP-1). Each checkpoint register has 32 registers, a write mask, and a restore mask.

FIG. 6 shows instructions I0,I2 without checkpoint tags, which indicates Instructions I0 and I2 are not branch or load instructions and do not require a checkpoint. The results of operations for instructions I1 and I2 are written into architectural registers R1 and R30, respectively.

After instruction I2, process 514 (FIG. 5) determines the next instruction is a load or branch instruction that requires a checkpoint. Accordingly, a tag for checkpoint CP-0 is enabled (CP_VALID flags are set) and the write masks corresponding to architectural registers that contain data are set for all checkpoint registers. As indicated in FIG. 7, which shows a snap shot of the registers at instruction I3, the write mask bits for registers R1 and R30 are set for all checkpoints to indicate the information in architectural registers R1 and R30 has changed since the last checkpoint occurred.

Referring to FIGS. 6 and 8, FIG. 8 is a snapshot of the architectural and checkpoint registers at instruction I7. Instruction I4 is a load or branch instruction and the entries (e.g., entry 400 in FIG. 4) for instructions I4,I5 and I6 have checkpoint tag field (CP_TAG) set indicating checkpoint zero (CP-0). Instruction I7 in FIG. 6 is another branch or load instruction and therefore another set of checkpoint registers (CP-1) is used for instruction I8 and subsequent instructions until another checkpoint is required for a next branch or load instruction.

With regard to FIG. 8, the contents of registers R31, R30, R1, and R2 used by instructions I0-I6 are written from architectural registers to corresponding registers in checkpoint 1 based on the write mask for checkpoint 1. The combination of restore mask and write mask provides the control for write back data from execution results, as indicated by processes 522-526 of FIG. 5. For instruction I0 with no checkpoint tag, the combination of '01' restore and write masks, respectively, indicates that the result should be written to CP-0 and an architectural register because there is no other later instruction writes to R1. For instruction I2, with no checkpoint, the combination of '11' restore and write masks indicates that the result should be written to CP-0 only because of later instruction I5 could have written a new value to R30 in architectural registers. For instructions I4-I6, with the CP-0 TAG set, the results from execution units should be written to architectural register only and not to CP-0.

In addition, on redirection, the checkpoint 0 write mask can be used to copy data from either architectural registers or checkpoint 0 registers to other checkpoints, effectively making all checkpoints have the same value as the architectural registers.

When the exception occurs, the write back or restore mode is enabled and the restore mask for checkpoint 0 (CP-0) is used to determine which data to write from checkpoint 0 registers into the architectural registers. In the example shown, data from registers R2, R30, and R31 in checkpoint register 0 are written in the corresponding architectural registers.

Referring to FIG. 9 shows a snapshot of the architectural and checkpoint registers after instruction I8. Instruction I3 has been correctly executed and the checkpointed instruction executes without an exception. The checkpoint may be cleared and used for subsequent instructions. In the example shown, checkpoint 0 is being retired, so the restore mask for checkpoint 0 is copied to the write mask, and the restore mask is disabled and cleared for checkpoint 0. The restore mask keeps track of which registers have been modified since checkpoint 0 was enabled, which is effectively the write mask for future use of checkpoint 0. The dashed lines show a redirection for checkpoint 1 and instruction I7 similar to that described for FIG. 8.

Figure 10:
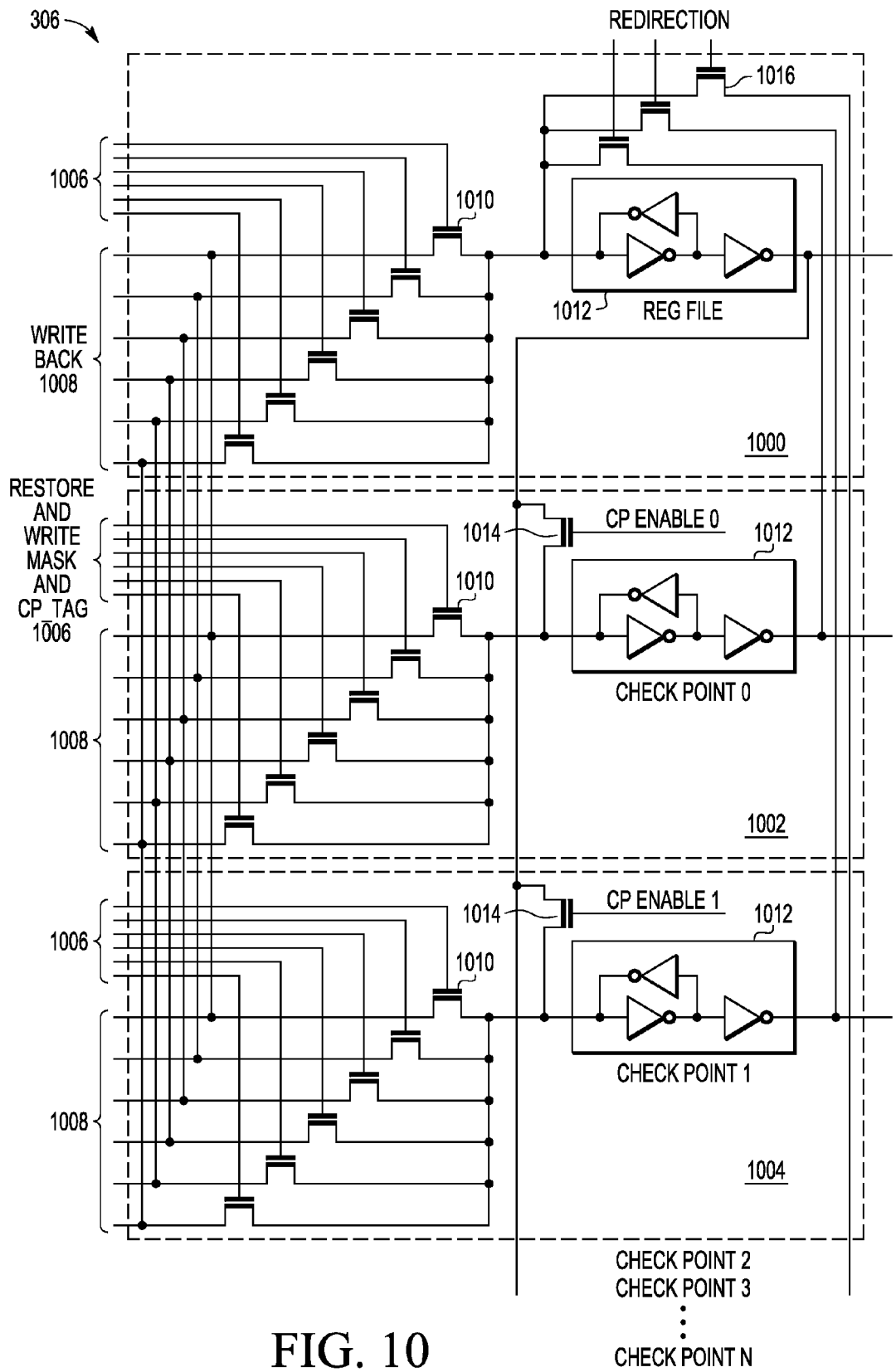
FIG. 10 is a diagram of an embodiment of architectural and checkpoint registers that can be used in the computer processor of FIG. 2.

FIG. 10 is a schematic diagram of an embodiment of architectural and checkpoint registers 306 that can be used in the computer processor 102 of FIG. 2 that includes architectural register circuit 1000, checkpoint 0 register circuit 1002, and checkpoint 1 register circuit 1004. Additional checkpoint register circuits 2 through N can be included depending on the number of checkpoint registers required for a particular processor 102. Additional architectural register circuits 1000 and corresponding checkpoint register circuits 0 through N can also be included but are not shown in FIG. 10 for simplicity.

The example of architectural register circuit 1000 and checkpoint register circuits 1002, 1004 shown include an input data section with a set of six control ports 1006 for receiving restore and write mask and CP_TAG indication and a set of six write ports 1008 for receiving write back data. Each line of ports 1006 is coupled to control a switch 1010 in a corresponding line of ports 1008. Switches 1010 are coupled to control input to a respective latch circuit 1012 in each of architectural register circuit 1000 and checkpoint register circuits 1002, 1004.

Architectural register circuit 1000 includes a set of redirection switches 1016 coupled between the input of latch circuit 1012 in architectural register circuit 1000 and the output of corresponding latch circuits 1012 in checkpoint register circuits 1002, 1004. Reditection switches 1016 correspond to process 530 of FIG. 5. For each redirection for a particular checkpoint, the restore mask is used to perform qualified write back to an architectural register. Additionally, checkpoint register circuits 1002, 1004 include a control switch 1014 coupled between the output of latch circuit 1012 of architectural register circuit 1000 and a corresponding input to latch circuits 1012 of checkpoint register circuits 1002, 1004. Checkpoint enable (CP_ENABLE0, CP_ENABLE1) signals 0 through N are coupled to control the operation of corresponding control switches 1014, which is represented by process 516 if FIG. 5. The checkpoint enable is qualified with write mask to enable only the checkpoint register with write mask set to 1. The use of restore/write masks reduces power consumption for checkpoint repair.

By now it should be appreciated that an embodiment of a processing system has been disclosed that comprises a decode unit which decodes instructions. The decode unit identifies instructions needing a checkpoint and, in response thereto, enables selected checkpoints. A register file unit, coupled to the decode unit, comprises: a plurality of architectural registers; a first set of checkpoint registers corresponding to a first checkpoint, wherein each checkpoint register of the first set corresponds to a corresponding architectural register of the plurality of architectural registers; a first set of indicators corresponding to the first set of checkpoint registers which, for each checkpoint register in the first set of checkpoint registers, indicates whether the corresponding architectural register has been modified or is intended to be modified prior to enabling of the first checkpoint; and a second set of indicators corresponding to the first set of checkpoint registers which, for each checkpoint register in the first set of checkpoint registers, indicates whether the corresponding architectural register has been modified or is intended to be modified after enabling of the first checkpoint.

In another aspect, the first set of indicators corresponding to the first set of checkpoint registers comprises a first indicator bit for each checkpoint register of the first set of checkpoint registers which, if asserted, indicates that the checkpoint register has been modified or is intended to be modified prior to enabling of the first checkpoint; and the second set of indicators corresponding to the first set of checkpoint registers comprises a second indicator bit for each checkpoint register of the first set of checkpoint registers which, if asserted, indicates that the checkpoint register has been modified or is intended to be modified after enabling of the first checkpoint.

In another aspect, when the decode unit determines that an instruction intends to perform a write to a first architectural register of the plurality of architectural registers. If the first checkpoint is not enabled, the first indicator bit for a first checkpoint register of the plurality of checkpoint registers which corresponds to the first architectural register is asserted. If the first checkpoint is enabled, the second indicator bit for the first checkpoint register is asserted.

In another aspect, in response to the decode unit determining that an instruction needs a checkpoint, the decode unit enables the first checkpoint and provides a checkpoint tag indicating the first checkpoint to at least one subsequently decoded instruction to indicate that the at least one subsequently decoded instruction is executed during when the first checkpoint is enabled.

In another aspect, the processor further comprises an execution unit which receives instructions from the decode unit for execution and provides results to the register file unit, wherein the register file unit comprises control circuitry. In response to the execution unit executing a first instruction which indicates a first architectural register of the plurality of architectural registers to receive a result, the control circuitry selectively uses the first set of indicators and the second set of indicators to determine whether to write the result to the first architectural register, to the corresponding checkpoint register of the first architectural register, or to both the first architectural register and the corresponding checkpoint register.

In another aspect, the control circuitry determines whether the first instruction has a corresponding checkpoint tag, and if the first instruction has a corresponding checkpoint tag which indicates the first checkpoint, the control circuitry writes the result to the first architectural register. If the first instruction does not have a corresponding checkpoint tag: if the first set of indicators indicates that the first architectural register has been modified or is intended to be modified prior to enabling of the first checkpoint, the control circuitry writes the result to the corresponding checkpoint register of the first architectural register, and if the second set of indicators indicates that the first architectural register has not been modified and is not intended to be modified after enabling of the first checkpoint, the control circuit writes to the result to the first architectural register.

In another aspect, the register file unit further comprises: a second set of checkpoint registers corresponding to a second checkpoint, wherein each checkpoint register of the second set corresponds to a corresponding architectural register of the plurality of architectural registers; a third set of indicators corresponding to the second set of checkpoint registers which, for each checkpoint register in the second set of checkpoint registers, indicates whether the corresponding architectural register has been modified or is intended to be modified prior to enabling of the second checkpoint; and a fourth set of indicators corresponding to the second set of checkpoint registers which, for each checkpoint register in the second set of checkpoint registers, indicates whether the corresponding architectural register has been modified or is intended to be modified after enabling of the second checkpoint.

In another aspect, in response to the decode unit determining that a first instruction needs a checkpoint, the decode unit enables a selected one of the first checkpoint and the second checkpoint.

In another aspect, the register file unit comprises control circuitry, wherein when the first checkpoint is restored, the control circuitry copies contents of checkpoint registers of the first set of checkpoint registers which are indicated by the second set of indicators to corresponding architectural registers of the plurality of architectural registers.

In another aspect, when the first checkpoint is restored, the control circuitry copies contents of architectural registers corresponding to checkpoint registers of the second set of checkpoint registers which are indicated by the third set of indicators to corresponding checkpoint registers of the second set of checkpoint registers.

In another embodiment, a data processing system having a plurality of architectural registers, a plurality of checkpoint register sets, each of the checkpoint register sets corresponding to a checkpoint of a plurality of checkpoints, wherein each checkpoint register set includes a plurality of checkpoint registers wherein each corresponds to a corresponding architectural register of the plurality of architectural registers, a first indicator corresponding to each checkpoint register of the checkpoint register set, and a second indicator corresponding to each checkpoint register of the checkpoint register set, a method comprises: receiving a first instruction; decoding the first instruction and determining that the first instruction intends to perform a write to a first architectural register of the plurality of architectural registers; for each checkpoint of the plurality of checkpoints: determining whether the checkpoint is enabled; if the checkpoint is not enabled, asserting the first indicator which corresponds to the checkpoint register of the corresponding checkpoint register set which corresponds to the first architectural register; and if the first checkpoint is enabled, asserting the second indicator which corresponds to the checkpoint register of the corresponding checkpoint register set which corresponds to the first architectural register.

In another aspect, the method further comprises: determining that a second instruction needs a checkpoint; enabling a first checkpoint selected from the plurality of checkpoints, wherein a first checkpoint register set of the plurality of checkpoint register sets corresponds to the first checkpoint; copying the contents of the architectural registers corresponding to the checkpoint registers of the first checkpoint register set whose corresponding first indicator is asserted to the corresponding checkpoint registers of the first checkpoint register set; and providing a checkpoint tag indicating the first checkpoint to a third instruction, subsequent to the second instruction, to indicate that the third instruction is executed during when the first checkpoint is enabled.

In another aspect, during write back for a fourth instruction, the method further comprises: determining that the fourth instruction writes a result to a second architectural register of the plurality of architectural registers; if no checkpoint of the plurality of checkpoints is enabled for the fourth instruction, then for each checkpoint, using the first indicator which corresponds to the checkpoint register of the corresponding checkpoint register set corresponding to the second architectural register to selectively write the result to the checkpoint register, and using the second indicator which corresponds to the checkpoint register of the corresponding checkpoint register set corresponding to the second architectural register to selectively write the result to the second architectural register; and if a checkpoint of the plurality of checkpoints is enabled for the fourth instruction, writing the result into the second architectural register.

In another aspect, during write back, the method further comprises: determining that a first checkpoint of the plurality of checkpoints is to be restored, wherein the first checkpoint has a corresponding first checkpoint register set of the plurality of checkpoint register sets; and copying contents of the checkpoint registers of the first checkpoint register set which are indicated by the corresponding second indicators to corresponding architectural registers of the plurality of architectural registers.

In another aspect, during write back, for each of the other checkpoint register sets other than the first checkpoint register set, the method further comprises: copying contents of architectural registers corresponding to checkpoint registers of the other checkpoint register set which are indicated by the corresponding first indicators to corresponding checkpoint registers of the other checkpoint register set.

In another aspect, during write back, the method further comprises: determining that a first checkpoint of the plurality of checkpoints is to be retired, wherein the first checkpoint has a corresponding first checkpoint register set of the plurality of checkpoint register sets; and copying values of the second indicators corresponding to the first checkpoint register set to the first indicators corresponding to the first checkpoint register set; and disabling the first checkpoint.

In another embodiment, a processor comprises: a decode unit which decodes instructions, wherein the decode unit identifies instructions needing a checkpoint and, in response thereto, enables checkpoints selected from a plurality of checkpoints; and a register file unit, coupled to the decode unit, comprising: a plurality of architectural registers; a plurality of checkpoint register sets, each checkpoint register set corresponding to a corresponding checkpoint of the plurality of checkpoints. Each checkpoint register set comprises: a plurality of checkpoint registers, wherein each checkpoint register corresponds to a corresponding architectural register of the plurality of architectural registers; a plurality of write mask bits, wherein each checkpoint register of the set of checkpoint registers has a corresponding write mask bit of the plurality of write mask bits; and a plurality of restore mask bits, wherein each checkpoint register of the set of checkpoint registers has a corresponding restore mask bit of the plurality of restore mask bits.

In another aspect, for each checkpoint register set: the plurality of write mask bits indicates whether or not the corresponding checkpoint register of the plurality of checkpoint registers has been modified or is intended to be modified prior to enabling of the corresponding checkpoint; and the plurality of restore mask bits indicates whether or not the corresponding checkpoint register of the plurality of checkpoint registers has been modified or is intended to be modified after enabling of the corresponding checkpoint.

In another aspect, the processor further comprises control circuitry, and wherein the decode unit determines that a first instruction intends to perform a write to a first architectural register of the plurality of architectural registers, and for each checkpoint of the plurality of checkpoints, the control circuitry: determines whether the checkpoint is enabled; if the checkpoint is not enabled, asserts a write mask bit which corresponds to the checkpoint register of the corresponding checkpoint register set which corresponds to the first architectural register; and if the checkpoint is enabled, asserting the restore mask bit which corresponds to the checkpoint register of the corresponding checkpoint register set which corresponds to the first architectural register.

In another aspect, the processor further comprises an execution unit which receives instructions from the decode unit for execution and provides results to the register file unit, wherein in response to executing a second instruction which indicates a second architectural register of the plurality of architectural registers to receive a result, the control circuitry: determines whether a checkpoint of the plurality of checkpoints is enabled for the second instruction. If no checkpoint of the plurality of checkpoints is enabled for the second instruction, then for each checkpoint, the control circuitry uses the write mask bit which corresponds to the checkpoint register of the corresponding checkpoint register set corresponding to the second architectural register to selectively write the result to the checkpoint register, and uses the restore mask bit which corresponds to the checkpoint register of the corresponding checkpoint register set corresponding to the second architectural register to selectively write the result to the second architectural register. If a checkpoint of the plurality of checkpoints is enabled for the second instruction, the control circuitry writes the result into the second architectural register.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the disclosure described herein are, for example, capable of operation in other orientations than those illustrated or otherwise described herein.

Some of the above embodiments, as applicable, may be implemented using a variety of different information processing systems. For example, although FIG. 1 and FIG. 2 and the discussion thereof describe an exemplary information processing architecture, this exemplary architecture is presented merely to provide a useful reference in discussing various aspects of the disclosure. Of course, the description of the architecture has been simplified for purposes of discussion, and it is just one of many different types of appropriate architectures that may be used in accordance with the disclosure. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

In one embodiment, system 100 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

Although the disclosure is described herein with reference to specific embodiments, various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to disclosures containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A processor comprising:
   a decode unit which decodes instructions, wherein the decode unit identifies instructions needing a checkpoint and, in response thereto, enables selected checkpoints;
   a register file unit, coupled to the decode unit, comprising:
   a plurality of architectural registers;
   a plurality of first sets of checkpoint registers, each of the plurality of first sets of checkpoint registers corresponding to a first checkpoint of a plurality of checkpoints, wherein each checkpoint register of the plurality of first sets of checkpoint registers corresponds to a corresponding architectural register of the plurality of architectural registers;
   a first set of indicators corresponding to each of the plurality of first sets of checkpoint registers which, for each checkpoint register in the plurality of first sets of checkpoint registers, indicates whether the corresponding architectural register has been modified or is intended to be modified prior to enabling of the first checkpoint of the plurality of checkpoints; and
   a second set of indicators corresponding to each of the plurality of first sets of checkpoint registers which, for each checkpoint register in the plurality of first sets of checkpoint registers, indicates whether the corresponding architectural register has been modified or is intended to be modified after enabling of the first checkpoint of the plurality of checkpoints; and control circuitry operable to:
for each checkpoint of the plurality of checkpoints:
determine whether the checkpoint of the plurality of checkpoints is enabled;
if the checkpoint of the plurality of checkpoints is not enabled, assert the first set of indicators; and
if the checkpoint of the plurality of checkpoints is enabled, assert the second set of indicators.

2. The processor of claim 1, wherein:
the first set of indicators corresponding to the plurality of first sets of checkpoint registers comprises a first indicator bit for each checkpoint register of the plurality of first sets of checkpoint registers which, if asserted, indicates that the checkpoint register has been modified or is intended to be modified prior to enabling of the first checkpoint of the plurality of checkpoints; and
the second set of indicators corresponding to the plurality of sets of checkpoint registers comprises a second indicator bit for each checkpoint register of the plurality of first sets-of checkpoint registers which, if asserted, indicates that the checkpoint register has been modified or is intended to be modified after enabling of the first checkpoint of the plurality of checkpoints.

3. The processor of claim 2, wherein when the decode unit determines that an instruction intends to perform a write to a first architectural register of the plurality of architectural registers,
if the first checkpoint of the plurality of checkpoints is not enabled, the first indicator bit for a first checkpoint register of the plurality of checkpoint registers which corresponds to the first architectural register is asserted, and
if the first checkpoint of the plurality of checkpoints is enabled, the second indicator bit for the first checkpoint register is asserted.

4. The processor of claim 1, wherein, in response to the decode unit determining that an instruction needs a checkpoint, the decode unit enables the first checkpoint of the plurality of checkpoints and provides a checkpoint tag indicating the first checkpoint of the plurality of checkpoints to at least one subsequently decoded instruction to indicate that the at least one subsequently decoded instruction is executed during when the first checkpoint of the plurality of checkpoints is enabled.

5. The processor of claim 4, wherein the processor further comprises an execution unit which receives instructions from the decode unit for execution and provides a plurality of results to the register file unit, wherein the register file unit comprises the control circuitry, and wherein:
in response to the execution unit executing a first instruction which indicates a first architectural register of the plurality of architectural registers to receive one of the plurality of results, the control circuitry selectively uses the first set of indicators and the second set of indicators to determine whether to write the one of the plurality of results to the first architectural register, to the corresponding checkpoint register of the first architectural register, or to both the first architectural register and the corresponding checkpoint register.

6. The processor of claim 5, wherein the control circuitry determines whether the first instruction has a corresponding checkpoint tag, and:
if the first instruction has a corresponding checkpoint tag which indicates the first checkpoint of the plurality of checkpoints, the control circuitry writes the one of the plurality of results to the first architectural register, and if the first instruction does not have a corresponding checkpoint tag:
if the first set of indicators indicates that the first architectural register has been modified or is intended to be modified prior to enabling of the first checkpoint of the plurality of checkpoints, the control circuitry writes the one of the plurality of results to the corresponding checkpoint register of the first architectural register, and
if the second set of indicators indicates that the first architectural register has not been modified and is not intended to be modified after enabling of the first checkpoint of the plurality of checkpoints, the control circuitry writes to the one of the plurality of results to the first architectural register.

7. The processor of claim 1, wherein the register file unit further comprises:
a plurality of second sets of checkpoint registers, each of the plurality of second sets of checkpoint registers corresponding to a second checkpoint of a plurality of second checkpoints, wherein each checkpoint register of the plurality of second sets of checkpoint registers corresponds to another corresponding architectural register of the plurality of architectural registers;
a third set of indicators corresponding to each of the plurality of second sets of checkpoint registers which, for each checkpoint register in the plurality of second sets of checkpoint registers, indicates whether the another corresponding architectural register has been modified or is intended to be modified prior to enabling of the second checkpoint of the plurality of second checkpoints; and
a fourth set of indicators corresponding to each of the plurality of second sets of checkpoint registers which, for each checkpoint register in the plurality of second sets of checkpoint registers, indicates whether the another corresponding architectural register has been modified or is intended to be modified after enabling of the second checkpoint of the plurality of second checkpoints.

8. The processor of claim 7, wherein, in response to the decode unit determining that a first instruction needs a checkpoint, the decode unit enables a selected one of the first checkpoint of the plurality of checkpoints and the second checkpoint of the plurality of second checkpoints.

9. The processor of claim 7, wherein when the first checkpoint of the plurality of checkpoints is restored, the control circuitry copies contents of checkpoint registers of the plurality of first sets of checkpoint registers which are indicated by the second set of indicators to corresponding architectural registers of the plurality of architectural registers.

10. The processor of claim 9, wherein when the first checkpoint of the plurality of checkpoints is restored, the control circuitry copies contents of architectural registers corresponding to checkpoint registers of the plurality of second sets of checkpoint registers which are indicated by the third set of indicators to corresponding checkpoint registers of the s plurality of second sets of checkpoint registers.

11. In a data processing system having a plurality of architectural registers, a plurality of checkpoint register sets, each of the checkpoint register sets corresponding to a checkpoint of a plurality of checkpoints, wherein each checkpoint register set of the plurality of checkpoint register sets includes a plurality of checkpoint registers wherein each checkpoint register corresponds to a corresponding architectural register of the plurality of architectural registers, a first indicator corresponding to each checkpoint register of the checkpoint register sets, and a second indicator corresponding to each checkpoint register of the checkpoint register sets, a method comprising:

receiving a first instruction;

decoding the first instruction and determining that the first instruction intends to perform a write to a first architectural register of the plurality of architectural registers;

for each checkpoint of the plurality of checkpoints:

determining whether the checkpoint is enabled;

if the checkpoint is not enabled, asserting the first indicator which corresponds to the checkpoint register of a corresponding checkpoint register set which corresponds to the first architectural register; and if the checkpoint is enabled, asserting the second indicator which corresponds to the checkpoint register of the corresponding checkpoint register set which corresponds to the first architectural register.

12. The method of claim 11, further comprising:

determining that a second instruction needs a checkpoint;

enabling a first checkpoint selected from the plurality of checkpoints, wherein a first checkpoint register set of the plurality of checkpoint register sets corresponds to the first checkpoint;

copying the contents of the architectural registers corresponding to the checkpoint registers of the first checkpoint register set whose corresponding first indicator is asserted to the corresponding checkpoint registers of the first checkpoint register set; and providing a checkpoint tag indicating the first checkpoint to a third instruction, subsequent to the second instruction, to indicate that the third instruction is executed during when the first checkpoint is enabled.

13. The method of claim 12, wherein during write back for a fourth instruction, the method further comprises:

determining that the fourth instruction writes a result to a second architectural register of the plurality of architectural registers;

if no checkpoint of the plurality of checkpoints is enabled for the fourth instruction, then for each of the plurality of checkpoints, using the first indicator which corresponds to one of the checkpoint registers of the corresponding checkpoint register set corresponding to the second architectural register to selectively write the result to the checkpoint register, and using the second indicator which corresponds to the checkpoint register of the corresponding checkpoint register set corresponding to the second architectural register to selectively write the result to the second architectural register; and if a checkpoint of the plurality of checkpoints is enabled for the fourth instruction, writing the result into the second architectural register.

14. The method of claim 11, wherein, during write back, the method further comprises:

determining that a first checkpoint of the plurality of checkpoints is to be restored, wherein the first checkpoint has a corresponding first checkpoint register set of the plurality of checkpoint register sets; and copying contents of the checkpoint registers of the first checkpoint register set which are indicated by the corresponding second indicators to corresponding architectural registers of the plurality of architectural registers.

15. The method of claim 14, wherein, during write back, for each of the other checkpoint register sets other than the first checkpoint register set, the method further comprises:

copying contents of architectural registers corresponding to checkpoint registers of the other checkpoint register set which are indicated by the corresponding first indicators to corresponding checkpoint registers of the other checkpoint register set.

16. The method of claim 11, wherein, during write back, the method further comprises:

determining that a first checkpoint of the plurality of checkpoints is to be retired, wherein the first checkpoint has a corresponding first checkpoint register set of the plurality of checkpoint register sets;

copying values of the second indicators corresponding to the first checkpoint register set to the first indicators corresponding to the first checkpoint register set; and disabling the first checkpoint.

17. A processor comprising:

a decode unit which decodes instructions, wherein the decode unit identifies instructions needing a checkpoint and, in response thereto, enables checkpoints selected from a plurality of checkpoints;

a register file unit, coupled to the decode unit, comprising:

a plurality of architectural registers;

a plurality of checkpoint register sets, each checkpoint register set corresponding to a corresponding checkpoint of the plurality of checkpoints, wherein each checkpoint register set comprises:

a plurality of checkpoint registers, wherein each checkpoint register corresponds to a corresponding architectural register of the plurality of architectural registers;

a plurality of write mask bits, wherein each checkpoint register of the checkpoint register set has a corresponding write mask bit of the plurality of write mask bits; and a plurality of restore mask bits, wherein each checkpoint register of the checkpoint register set has a corresponding restore mask bit of the plurality of restore mask bits; and control circuitry, wherein the decode unit determines that a first instruction intends to perform a write to a first architectural register of the plurality of architectural registers, and for each checkpoint of the plurality of checkpoints, the control circuitry:

determines whether the checkpoint is enabled;

if the checkpoint is not enabled, asserts a write mask bit which corresponds to the checkpoint register of a corresponding checkpoint register set which corresponds to the first architectural register; and if the checkpoint is enabled, asserting the restore mask bit which corresponds to the checkpoint register of the corresponding checkpoint register set which corresponds to the first architectural register.

18. The processor of claim 17, wherein, for each checkpoint register set:

each of the plurality of write mask bits indicates whether or not a corresponding checkpoint register of the plurality of checkpoint registers has been modified or is intended to be modified prior to enabling of the corresponding checkpoint; and each of the plurality of restore mask bits indicates whether or not the corresponding checkpoint register of the plurality of checkpoint registers has been modified or is intended to be modified after enabling of the corresponding checkpoint.

19. The processor of claim 17, wherein the processor further comprises an execution unit which receives instructions from the decode unit for execution and provides results to the register file unit, wherein in response to executing a second instruction which indicates a second architectural register of the plurality of architectural registers to receive a result, the control circuitry:
- determines whether a checkpoint of the plurality of checkpoints is enabled for the second instruction;
- if no checkpoint of the plurality of checkpoints is enabled for the second instruction, then for each checkpoint, uses the write mask bit which corresponds to the checkpoint register of the corresponding checkpoint register set corresponding to the second architectural register to selectively write the result to the checkpoint register, and uses the restore mask bit which corresponds to the checkpoint register of the corresponding checkpoint register set corresponding to the second architectural register to selectively write the result to the second architectural register; and
- if a checkpoint of the plurality of checkpoints is enabled for the second instruction, writes the result into the second architectural register.

* * * * *